Dec. 4, 1934.  H. W. RUPPLE  1,982,964
HOPPER MAGAZINE FEED DEVICE
Filed Nov. 21, 1931  5 Sheets-Sheet 1

INVENTOR:
HARRY W. RUPPLE

ATTORNEYS

Dec. 4, 1934.  H. W. RUPPLE  1,982,964
HOPPER MAGAZINE FEED DEVICE
Filed Nov. 21, 1931  5 Sheets-Sheet 2

INVENTOR:
HARRY W. RUPPLE
Kwin Hudson & Kent
ATTORNEYS.

Dec. 4, 1934.  H. W. RUPPLE  1,982,964
HOPPER MAGAZINE FEED DEVICE
Filed Nov. 21, 1931  5 Sheets-Sheet 3

INVENTOR:
HARRY W. RUPPLE
Kerie Hudson & Kent
ATTORNEYS

Dec. 4, 1934.　　　　H. W. RUPPLE　　　　1,982,964
HOPPER MAGAZINE FEED DEVICE
Filed Nov. 21, 1931　　　5 Sheets-Sheet 4

INVENTOR:
HARRY W. RUPPLE
ATTORNEYS

Dec. 4, 1934.   H. W. RUPPLE   1,982,964
HOPPER MAGAZINE FEED DEVICE
Filed Nov. 21, 1931   5 Sheets-Sheet 5

INVENTOR:
HARRY W. RUPPLE
Kwia Hudson & Kent
ATTORNEYS

Patented Dec. 4, 1934

1,982,964

UNITED STATES PATENT OFFICE 1,982,964

HOPPER MAGAZINE FEED DEVICE

Harry W. Rupple, Shaker Heights, Ohio, assignor to The Cleveland Automatic Machine Company, Cleveland, Ohio, a corporation of Ohio Application November 21, 1931, Serial No. 576,537

22 Claims. (Cl. 29—60)

The present invention relates to metal working machines, and more particularly to a hopper magazine work feed device for an automatic metal working machine tool of the general class wherein the stock or blank to be machined is fed through a rotatably mounted spindle and operated upon by one or a plurality of tools supported on suitable slides, etc. In machines of the type referred to, the work is usually clamped or held in an automatic chuck carried by the spindle, the jaws of which are operated in predetermined timed relation to the feeding operation and the movement of the tools, etc., all of which is controlled from a main cam shaft of the machine.

An object of the present invention is the provision of a novel hopper magazine feed device for holding a plurality of work pieces and feeding the same to an automatic metal working machine tool.

Another object of the present invention is the provision of a novel hopper magazine feed device for holding a plurality of work pieces and feeding them in tandem relationship to a position from which they are automatically fed to a machine tool, and automatic means for feeding the work pieces to the machine tool.

Another object of the invention is the provision of a novel automatic metal working machine tool provided with a hopper magazine feed device adapted to support a plurality of work pieces, and means for feeding the work at predetermined intervals.

Another object of the invention is the provision of a novel automatic metal working machine tool provided with a spindle, a hopper magazine feed device consisting of vertical projections converging toward the bottom to form a hopper provided with an opening at the bottom through which work pieces feed in tandem relation to a position in alignment with the work spindle, and means for feeding the work pieces in alignment with said spindle to said spindle.

Another object of the invention is the provision of a novel means for preventing work pieces positioned in the spindle of an automatic metal working machine of the type wherein a plurality of rotatable spindles are supported in an indexible spindle head and indexed from station to station, from moving in a direction reverse to their feeding movement during the indexing of the spindle head and before they are clamped in the chuck carried by the spindle.

Other advantages and objects of the invention will be apparent to those skilled in the art from the following description of the preferred embodiment of the invention described with reference to the accompanying drawings, in which.

Figure 1:
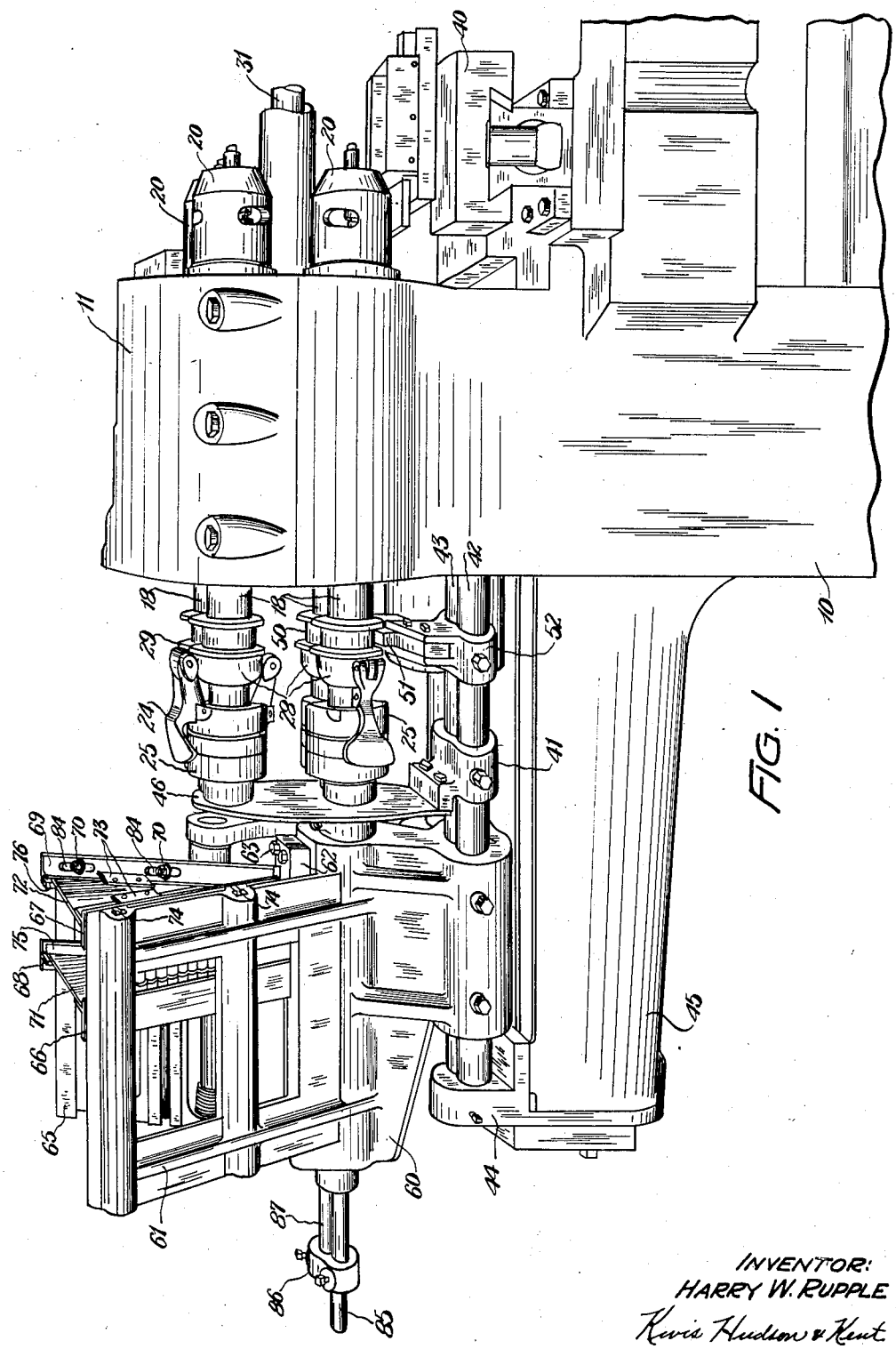
Figure 1 is a perspective view of the spindle end of an automatic metal working machine tool embodying the present invention.
Figure 2:
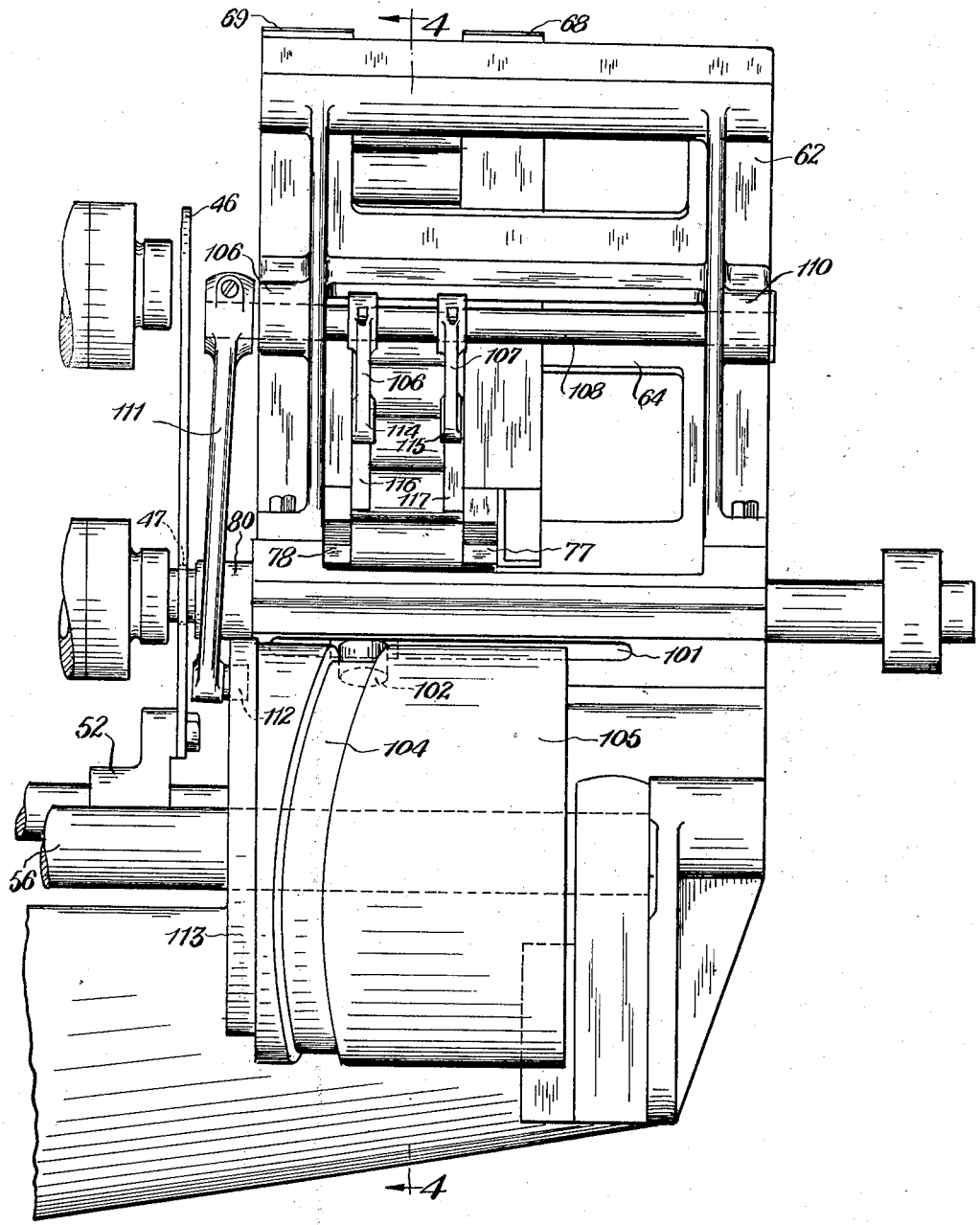
Fig. 2 is a rear elevational view of the hopper magazine feed device shown in Fig. 1.

Referring to the drawings, reference character 10 designates the bed of an automatic metal working machine tool, of which the spindle end alone is illustrated. A spindle head 11 carried on one end of the bed 10 rotatably supports a spindle turret 12 in suitable bearings 13 and 14. The spindle turret 13 is held from longitudinal movement in the spindle head 11 by a flange 15 formed on one end thereof and a removable ring 16 secured to the other end thereof, as by the screws 17.

A plurality of spindles 18 in the present instance four, are rotatably supported in a plurality of circularly arranged longitudinal apertures in the spindle turret 12. The spindles 18 are of ordinary construction and include a rotatable sleeve 19 carrying at one end a chuck 20 and mounted in tapered bearings 21 and 22 provided with means to take up wear. The jaws 23 of the chuck 20 are adapted to be operated to engage and disengage the work A by bell-crank levers 24 pivotally carried by a member 25 supported on the exterior of the sleeve 19, through a tube 26 in a manner well known in the art. One arm of the bell-crank lever 24 carries a roller 27 adapted to engage a cam surface 28 on a cam member 29 slidably supported on the sleeve 19. The spindles 18 are driven by gears 30 keyed to the sleeve 19 and continuously in mesh with a gear, not shown, on the main drive shaft 31, which projects through a suitable opening in the center of the spindle turret 12. A tube 35 fixed at one end to a short tubular member 36 threaded into the sleeve 19, as by set-screws 37, projects into the spindle and carries at its inner end spring fingers 38 adapted to engage and support the work. The interior diameter of the tube 35 is slightly greater than the outside diameter of the work, and to accommodate different sizes of work, tubes of suitable diameter are substituted for the tubes 35.

Figure 3:
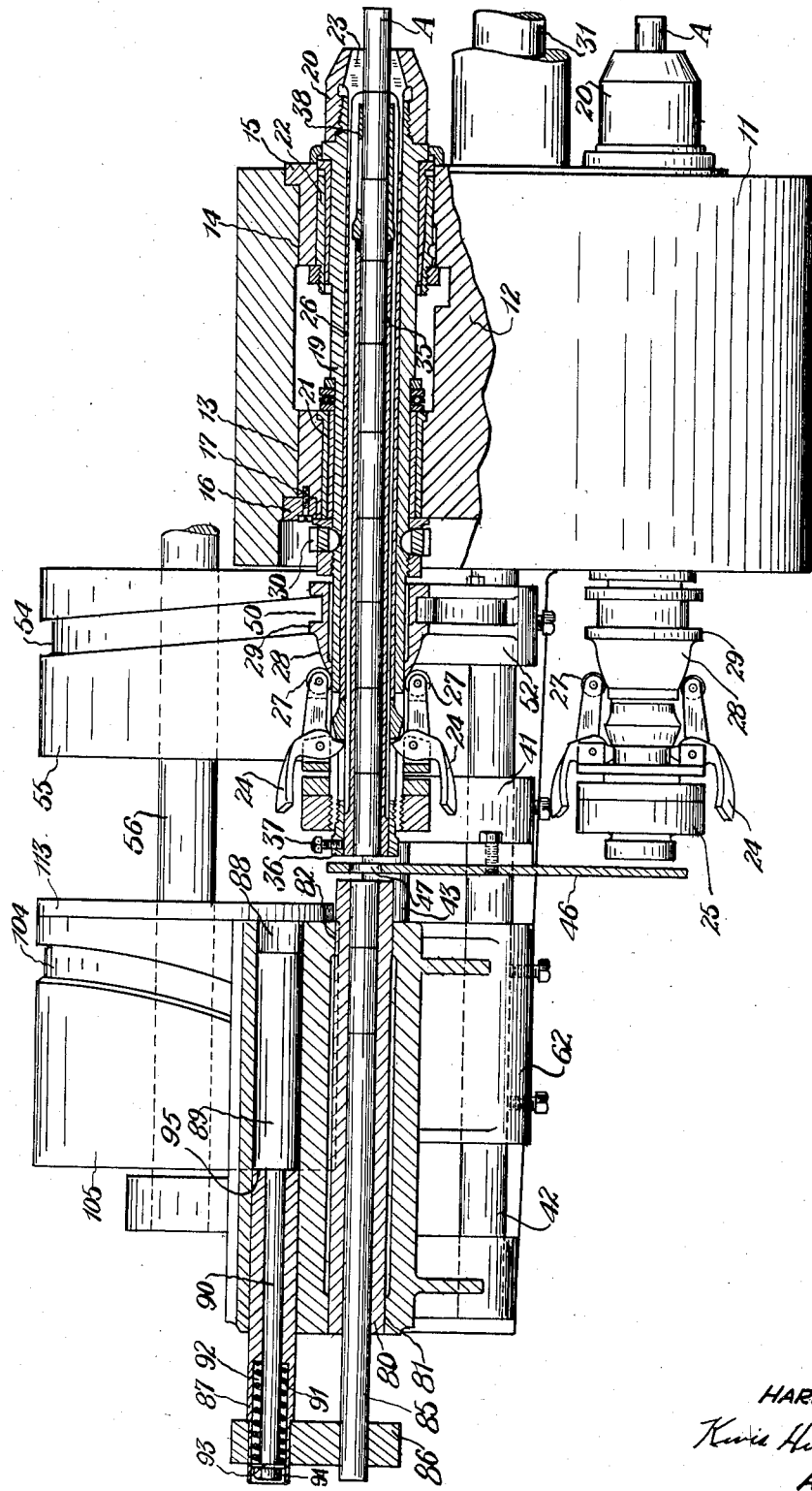
Fig. 3 is a sectional view with portions in elevation taken on line 3—3 of Fig. 4, looking in the direction of the arrows.

The work illustrated in the drawings and indicated by the reference character A consists of short lengths of bars or tubes, a plurality of which are required to fill the spindle and only one of which is engaged by the chuck jaws 23 at a time. The spindle turret 12 is indexed in any well known manner so that the spindles are moved from station to station where the tools, not shown, carried on suitable slides 40, only one of which is shown perform the necessary machining operations. The feeding operation takes place at the lower rear station as viewed in Fig. 1, and each time a spindle is indexed to this station, a new blank is fed thereto by mechanism to be described later. A member 41 is adjustably supported on a pair of rods 42 and 43 supported at one end in the bed 10 and at the other end in a bracket 44 fixed to a horn 45 projecting from the bed 10 toward the left, as viewed in Fig. 1. The member 41 carries a disk-shaped plate 46 adapted to close the left-hand openings in the spindles, as viewed in Figs. 1 and 3, or at least part of each opening, in such a manner that the work positioned in the spindles is prevented from working back through the rear and dropping therefrom. To permit feeding of the blanks at the lower rear station, an aperture 47 is formed in the plate 46 in line with the spindle opening at this station.

The cam members 29 are provided with a groove 50 in which a shoe 51 engages when the spindle is in the lower rear station. The shoe 51 is supported on a member 52 slidably mounted on the rods 42 and 43 and reciprocated in timed relation to the feeding operations, etc., by the engagement of a roller carried by the member 52 in a cam groove 54 on a cam drum 55 fixed on the main cam shaft 56 of the machine.

Figure 4:
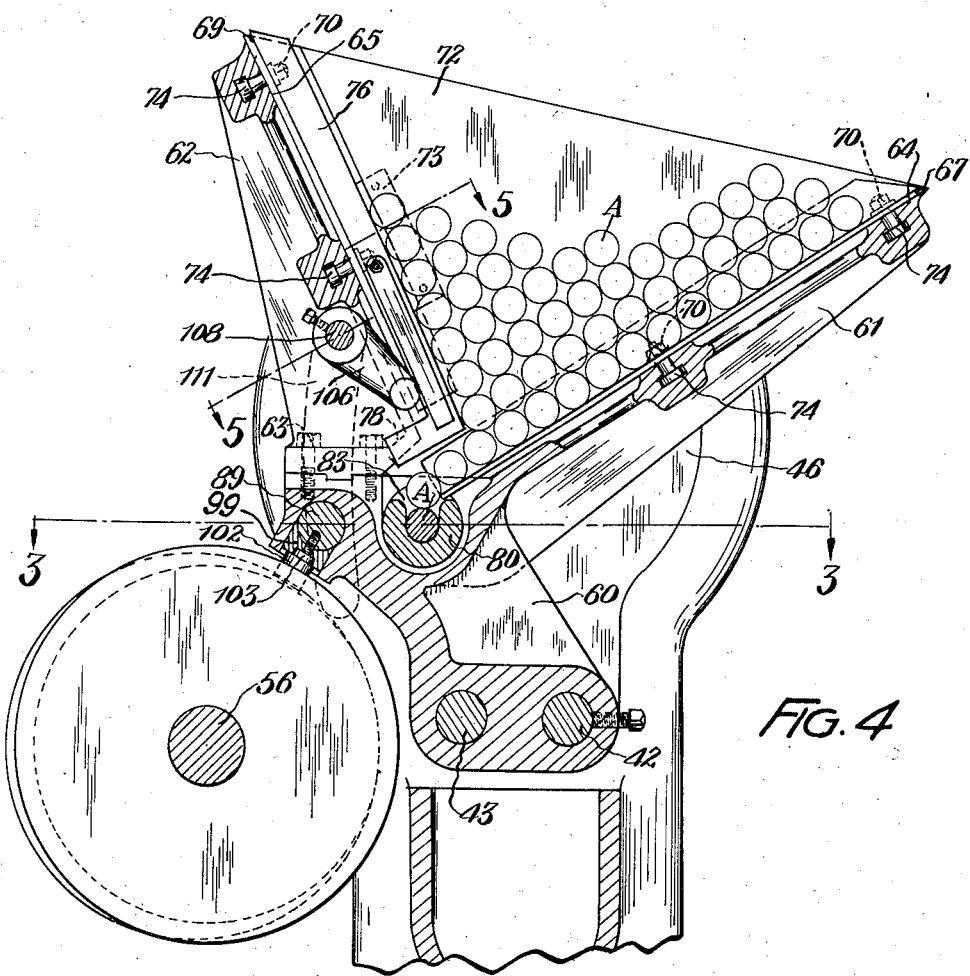
Fig. 4 is a sectional view with the cam drum and work pieces in elevation, taken on the line 4—4 of Fig. 2, looking in the direction of the arrows.

A hopper magazine device for supporting a plurality of work pieces A and feeding the same to the spindles is supported on the machine to the left of the plate 46, as viewed in Fig. 1, and includes a member 60 adjustably carried on the rods 42 and 43 is provided with a vertical member 61 projecting therefrom at an angle toward the front. A member 62 secured to the member 60 as by the bolts 63, constitutes a vertical member projecting from the member 60 toward the rear. Both of the vertical members 61 and 62 are of web construction and a finished face 64 of the member 61 extends at an angle to the face 65 of the member 62 which is spaced therefrom, as shown in Fig. 4.

Figure 5:
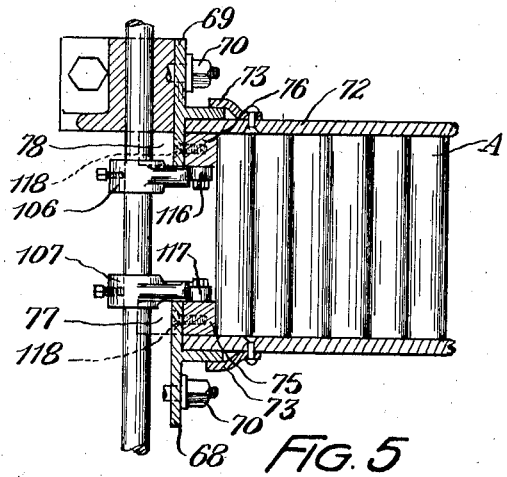
Fig. 5 is a sectional view, with portions in elevation, taken on the line 5—5 of Fig. 4, looking in the direction of the arrows.

T-shaped members 66 and 67 are secured to the face 64 of the member 61, and the T-shaped members 68 and 69 are secured to the face 65 of the member 62, as by bolts 70, and support wedge-shaped end plates 71 and 72 held thereto by spring clips 73. The heads of the bolts 70 are slidably carried in T-slots 74 in the members 61 and 62 in such a manner that the T-shaped members 66, 67, 68 and 69 may be adjusted along the respective faces 64 and 65 to accommodate different lengths of work. Bars 75 and 76 are fixed to the T-shaped members 68 and 69, respectively, and are adapted to have the work pieces positioned in the hopper formed by the vertical members 61 and 62 and the end plates 71 and 72 rest thereon, as shown in Figs. 4 and 5.

The bars 75 and 76 have formed on the lower ends thereof projections 77 and 78 which, together with the lower ends of the T-shaped members 66 and 67, form an opening through which the work pieces pass in tandem relation to a tubular member 80 fixed in suitable bearings 81 and 82 in the member 60. The tubular member 80 has a suitable slot 83 formed in the top thereof through which the work pieces pass to the interior thereof. The tubular member 80 is adapted to position a work piece in alignment with the opening in the spindle in the lower rear or feeding station, and to accommodate work of different diameters, a tubular member with a suitable inside diameter is substituted for the tubular member shown. The openings 84 in the T-shaped members 68 and 69 through which the bolts 70 pass are elongated slots which permit adjustment of the members 68 and 69 to vary the opening formed by the projections 77 and 78 and the T-shaped members 66 and 67 to accommodate work of different diameters.

A rod 85, fixed at one end in a member 86 carried by a tubular member 87, slidably supported in a longitudinal aperture 88 in the member 60, projects into the tubular member 80 and upon reciprocation feeds the work positioned therein to the spindle. A cylindrical member 89 also slidably supported in the aperture 88 has a reduced portion 90 extending through the tubular member 87. A spring 91 is positioned in an enlarged bore 92 in one end of the tubular member 87 and is compressed between a washer 93 fixed to the reduced portion 90 of the cylindrical member 89 by a nut 94 and the bottom of the bore 92. The spring 91 holds the tubular member 87 in engagement with the shoulder 95 on the cylindrical member 89 but allows relative movement therebetween.

The aperture 88 has an opening in the form of a slot 101 in the lower rear side thereof extending to the exterior of the member 60. A member 99 slidable in the slot 101 and fixed to the cylindrical member 89 carries a roller 102 rotatably supported on a pin 103. The roller 102 engages in a cam track 104 on the cam drum 105 fixed to the main cam shaft. The construction is such that the rod 85 is reciprocated by the cam drum 105 to feed the work to the spindles, and should the work become jammed, etc., the spring 91 permits the cylindrical member 89 to move relative to the tubular member 87 and prevent damage to the machine.

To prevent the work pieces from becoming clogged in the hopper, the following means is provided for continuously agitating them. A pair of levers 106 and 107 are adjustably secured to a shaft 108 rotatably mounted in bosses 109 and 110 formed on the member 62. A lever 111 is non-rotatably supported on one end of the shaft 108 and carries a cam roller 112 on the lower end thereof. The cam roller 112 engages a face cam 113 on the end of the cam drum 105. The levers 106 and 107 are provided with heads 114 and 115 on the lower ends thereof which engage members 116 and 117 respectively. The members 116 and 117 are pivotally carried by the bars 76 and 75 respectively on screws 118 secured thereto. The members 116 and 117 are oscillated about their pivots 118 by the levers 106 and 107 as the shaft 108 is oscillated by the engagement of the cam roller 112 with the face cam 113.

Figure 6:
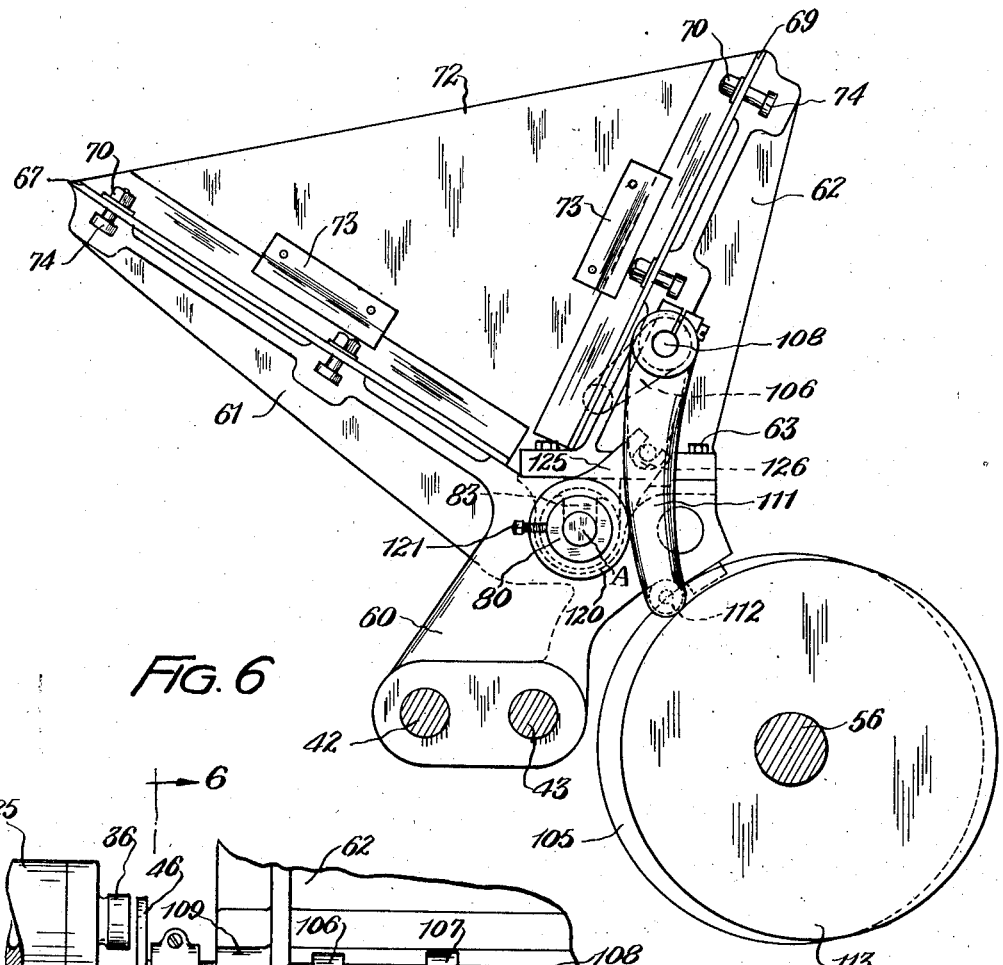
Fig. 6 is a sectional view of a modified construction of hopper magazine feed device taken on the line 6—6 of Fig. 7.
Figure 7:
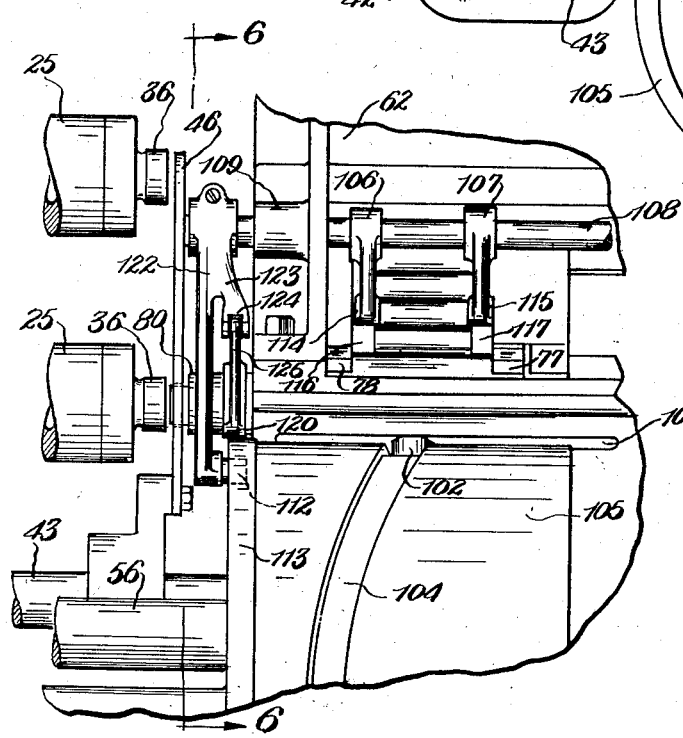
Fig. 7 is a rear elevational view of the hopper magazine feed device shown in Fig. 6.

In the modification illustrated in Figs. 6 and 7 the tubular member 80 is rotatably supported in the bearings 81 and 82 formed in the member 60 and carries at the right hand end thereof, as viewed in Fig. 7, a collar member 120 non-rotatably secured thereto by a set-screw 121. The lever 111 shown in the preferred embodiment is replaced in the modification by a lever 122, similar to lever 111, but provided with a second arm 123. The lever 122 is non-rotatably carried on one end of the shaft 108 and the second arm 123 has a yoke 124 formed on the end thereof. The collar member 120 is provided with a projecting arm 125 provided with a slot 126 in the end thereof. The slot 126 engages a roller carried on a pin 127 supported in the yoke end 124 of the arm 123, and as the lever 122 is oscillated about the axis of the shaft 108 by the face cam 113, the arm 123, etc., oscillates the tubular member 80 about its axis.

The operation of the machine is as follows: The T-shaped members 66, 67, 68 and 69, together with the end members 71 and 72 and the levers 106 and 107, are adjusted to accommodate the length of work pieces to be machined, after which the hopper is filled with work and the machine started. The bottom work piece in the hopper moves through the passage formed by the projections 77 and 78 and the T-shaped members 66 and 67 and drops through the opening into the interior of the member 80 in front of the rod 85. At every revolution of the cam shaft, the spindle turret 12 is indexed 90°, causing successive spindles to be brought to the lower rear or feeding station. After the spindle has been indexed to the feeding station, the chuck jaws 23 are released by the action of the cam roller on the member 52 in the cam track 54 through the cam member 29 and the bellcranks 24, etc. The rod 85 is then moved to feed a piece of work to the spindle through the operation of the cam track 104 on the cam disk 105 and the cam roller 102. After the blank has been fed to the spindle the rod 85 is retracted and another work piece drops into the interior of the member 80. After the feeding operation has been completed, the member 52 is moved by the cam drum 55 to again close the chuck jaws 23 and the work piece farthest advanced in the spindle is securely held by the jaws. The spindle is then indexed to the other stations where the machining operations are performed. The finished work piece is ejected by the following work piece during the feeding operation.

The construction of the modified form shown in Figs. 7 and 8 is such that when the tubular member 80 is oscillated about its axis, the opening 83 is moved to a position where the bottom work piece in the passage formed by the projections 77 and 78 and the T-shaped members 66 and 67 will abut the outside surface of the tubular member 80 and not the work piece inside the member 80, during the feeding operation. After the work piece in the tubular member 80 has been fed to the spindle by the rod 85 the member 80 is returned to its original position, permitting a work piece to drop therein, after which it is again oscillated to close the passage to the hopper during the next feeding operation. The tubular member 80 may be oscillated in either direction. The modified construction permits work pieces with projections or irregular surfaces, such as studs threaded at one or both ends, to be fed to the machine spindles without causing the projections or irregular surfaces to engage each other.

The embodiments of the invention illustrated and described are merely the preferred forms, and I do not wish to be limited to the particular constructions shown and described, which may be varied within the scope of this invention, and I particularly point out and claim as my invention:

1. In a feed device of the character described, the combination of a frame adapted to be attached to a machine tool, a hopper magazine converging towards the bottom thereof and carried by said frame and adapted to support a plurality of work pieces, a replaceable member in said frame adapted to support work in a position to be fed to the machine, said frame being provided with an opening communicating with said member and said hopper through which work pieces are permitted to move from said hopper to said member, means for adjusting the width of said opening, a plunger slidably carried in said frame in alignment with work supported by said member, and resilient means for moving said plunger to feed a work piece positioned in said member to the machine.

2. In a machine of the character described, the combination of a frame, a plurality of work spindles indexibly supported by said frame, a chuck carried by each of said work spindles at one end thereof, a hopper carried by said frame adapted to support a plurality of work pieces, means in said hopper adapted to support one of said work pieces in alignment with the end of one of said spindles remote from said chuck, and means for feeding a work piece supported by said means to said spindle.

3. In a machine of the character described, the combination of a frame, a spindle rotatably mounted in said frame, a replaceable sleeve positioned inside of said spindle, a hopper carried by said frame adapted to support a plurality of work pieces, replaceable means in said hopper adapted to support work in alignment with said sleeve, a plunger slidably mounted in said hopper in alignment with said spindle, and means for reciprocating said plunger whereby work supported by said first mentioned means is fed to said spindle.

4. In a machine of the character described, the combination of a frame, a chuck carried by said spindle, means for actuating said chuck at predetermined intervals, a spindle rotatably supported in said frame, a member adjustably mounted on said frame, vertical projections on said member adapted to support a plurality of work pieces therebetween, end plates supported by said projections, means for adjusting the end plates relative to each other to accommodate different lengths of work, means in said member adapted to support work in alignment with said spindle, said member being provided with an opening through which work pieces pass from between said projections to said last mentioned means, a plunger slidably carried by said member adapted to feed work supported by said last mentioned means to said spindle, and resilient means for reciprocating said plunger in predetermined timed relation to the operation of said chuck.

5. In a machine of the character described the combination of a frame, a spindle rotatably carried by said frame, a member adjustably mounted on said frame, vertical projections on said member converging toward the bottom to form a hopper adapted to support a plurality of work pieces, means in said member adapted to support a work piece in alignment with said spindle, adjustable means in said hopper adapted to feed work pieces from between said projections to said first mentioned means in tandem relation, and means for feeding a work piece positioned in said first mentioned means to said spindle.

6. In a machine of the character described, the combination of a frame, a spindle rotatably supported by said frame, a member adjustably supported by said frame, vertical projections on said member, said projections converging toward the bottom and adapted to support a plurality of work pieces, end plates supported by said projections, means for adjusting said end plates relative to each other to accommodate different lengths of work, means in said member adapted to support one of said work blanks in alignment with said spindle, a plunger slidably supported in said member in alignment with said spindle, and resilient means for reciprocating said plunger whereby the work pieces supported in said means is fed to said spindle.

7. In a machine of the character described, the combination of a frame, a spindle rotatably carried by said frame, a member adjustably carried by said frame, vertical projections on said member converging toward the bottom to form a hopper with an opening at the bottom and adapted to support a plurality of work pieces, end plates adjustably supported on said vertical projections, an agitator in said hopper comprising a pivoted lever projecting towards the bottom of said hopper, means in said member and adjacent said opening adapted to support a work piece in alignment with said spindle, and means for feeding a work piece supported in said means to said spindle.

8. In a machine of the character described, the combination of a member adapted to be indexed about an axis at predetermined intervals, a spindle carried by said member and spaced from said axis, a chuck carried by said spindle at one end thereof said spindle being adapted to have a plurality of work pieces positioned therein and fed therethrough, and means for closing the end of said spindle remote from the chuck during the indexing thereof.

9. In a machine of the character described the combination of a frame, a member rotatably mounted in said frame and adapted to be indexed about its axis through a plurality of stations, a plurality of spindles carried by said member and adapted to have work fed therethrough, chucks carried by said spindles at one end thereof means for feeding work to said spindles at one of said stations, and means adjustably supported by said frame adapted to close one end of said spindles during the indexing of said member.

10. In a machine of the character described, the combination of a frame, a work spindle supported on said frame, a hopper supported on said frame adjacent said spindle and adapted to support a plurality of work pieces, means in said hopper adapted to support one of said work pieces in alignment with said spindle, said hopper being provided with a passage communicating with said means and through which the work pieces pass to said means, means for feeding a work piece supported by said means to said spindle, and means for closing said passage during the operation of said feeding means.

11. In a machine of the character described, the combination of a frame, a spindle rotatably carried in said frame, a member adjustably carried by said frame, vertical projections on said frame, said projections converging toward the bottom and adapted to support a plurality of work pieces, a tubular member rotatably supported in said member adapted to support a work piece positioned inside thereof in alignment with said spindle, an opening in said tubular member adapted to permit work pieces supported in said vertical projections to pass to the interior of said tubular member, means for oscillating said tubular member to close said opening to said work pieces, and means for feeding work pieces positioned inside said tubular member to said spindle.

12. A magazine for a machine tool comprising a frame forming a hopper converging towards the bottom thereof and adapted to support a plurality of work pieces and be attached to a machine tool, a replaceable member slidably supported by said frame adapted to support a work piece in a position to be fed to a machine tool, said frame being provided with a passage communicating with said hopper and said member through which work pieces are adapted to move in tandem from said hopper to said member, means for feeding work supported by said member to said machine tool, and means for adjusting the width of said passage to accommodate different sizes of work.

13. A magazine for a machine tool comprising a frame forming a V-shaped hopper adapted to support a plurality of work pieces and be attached to a machine tool, means supported by said frame adapted to support a work piece in a position to be fed to a machine tool, said frame being provided with a passage communicating with said hopper and said means through which work pieces are adapted to move in tandem from said hopper to said member, means for feeding work supported by said member to said machine tool, and an agitator in said hopper comprising a pivoted arm adapted to engage work pieces positioned in said hopper.

14. A magazine for a machine tool comprising a frame forming a V-shaped hopper adapted to support a plurality of work pieces and be attached to a machine tool, a member supported by said frame adapted to support a work piece in a position to be fed to the machine tool, said frame being provided with a passage communicating with said hopper and said member through which work pieces are adapted to pass in tandem from said hopper to said member, and an agitator in said hopper comprising a pivoted arm the free end of which projects toward the bottom of said hopper but is spaced therefrom approximately the width of said passage.

15. In a machine of the character described, the combination of a frame, an indexible spindle turret supported by said frame, a plurality of spindles rotatably supported by said spindle turret adapted to have work fed through the center thereof, means for indexing said spindle turret whereby said spindles are indexed through a plurality of stations including a feeding station, a magazine supported by said frame adapted to support work in alignment with the spindle in the feeding station, means for feeding work from said magazine to said spindles at the feeding station, and means for limiting movement of work in said spindles in a direction reverse to the feeding movement.

16. In a machine of the character described, the combination of a frame, an indexible spindle turret supported by said frame, a plurality of spindles rotatably supported by said spindle turret adapted to have work fed through the center thereof, means for indexing said spindle turret whereby said spindles are indexed through a plurality of stations including a feeding station, a chuck supported by each of said spindles at one end thereof, means supported by said frame for operating said chucks at the feeding station, a stationary magazine supported by said frame adapted to support a work piece in alignment with the spindle in the feeding station, means for feeding work from said magazine to the spindle in the feeding station in predetermined timed relation to the operation of the chuck supported thereby, and means for limiting the movement of work in said spindles in a direction reverse to the feeding movement.

17. In a machine of the character described, the combination of a frame, an indexible spindle turret supported by said frame, a plurality of tubular spindles rotatably supported by said spindle turret adapted to support a plurality of work pieces in the center thereof, means for indexing said spindle turret whereby said spindles are indexed through a plurality of stations, an opening in said spindles adapted to have work fed therethrough to the center of said spindles, and means for closing said opening at one of said stations.

18. In a machine of the character described, the combination of a frame, an indexible spindle turret supported by said frame, a plurality of tubular spindles rotatably supported by said spindle turret adapted to support a plurality of work pieces in the center thereof, means for indexing said spindle turret whereby said spindles are indexed through a plurality of stations, chucks supported by said spindles at one end thereof, means for feeding work into the ends of said spindles remote from said chucks at one of said stations, and means for closing the ends of said spindles remote from said chucks at one of said stations.

19. In a machine of the character described, the combination of a frame, an indexible spindle turret rotatably supported by said frame, a plurality of tubular spindles rotatably supported by said spindle turret adapted to support a plurality of work pieces in the center thereof, means for indexing said spindle turret whereby said spindles are indexed through a plurality of stations including a feeding station, chucks carried by said spindles at one end thereof, means for feeding work supported in said spindles through said chucks, and means for preventing movement of work pieces through said spindles in a reverse direction.

20. In a machine of the character described, the combination of a frame, an indexible spindle turret supported by said frame, a plurality of tubular spindles rotatably supported by said spindle turret adapted to support a plurality of work pieces in the center thereof, means for indexing said spindle turret whereby said spindles are indexed through a plurality of stations including a feeding station, chucks supported by said spindles at one end thereof, a magazine supported by said frame adapted to support a work piece of less length than that of the spindles in alignment with the spindle in the feeding station, means for feeding work from said magazine to said spindles and through said chucks at the feeding station, and means for limiting the movement of work in said spindle in a reverse direction.

21. In a machine of the character described, the combination of a frame, an indexible spindle turret supported by said frame, a plurality of tubular spindles rotatably supported by said spindle turret adapted to support a plurality of work pieces in the center thereof, means for indexing said spindle turret whereby said spindles are indexed through a plurality of stations, chucks supported by said spindles at one end thereof, a magazine supported by said frame adapted to support short lengths of work in alignment with the ends of the spindle remote from the chucks in one of said stations, means for feeding short lengths of work from said magazine to said spindles at said stations, and means for closing the ends of said spindles remote from said chucks at the other of said stations.

22. In a machine of the character described, the combination of a frame, an indexible spindle turret supported by said frame, a plurality of tubular spindles rotatably supported by said spindle turret adapted to support a plurality of work pieces in the center thereof, means for indexing said spindle turret whereby said spindles are indexed through a plurality of stations, chucks supported by said spindles at one end thereof, means supported by said frame for operating said chucks at one of said stations, a stationary magazine supported by said frame adapted to support short lengths of work in alignment with the end of the spindle in said station remote from said chuck, means for feeding short lengths of work from said magazine to said spindle in predetermined timed relation to the operation of the chuck, and means for preventing the movement of work pieces in said spindles in a direction reverse to the feeding movement.

HARRY W. RUPPLE.